United States Patent Office 3,167,155
Patented Jan. 26, 1965

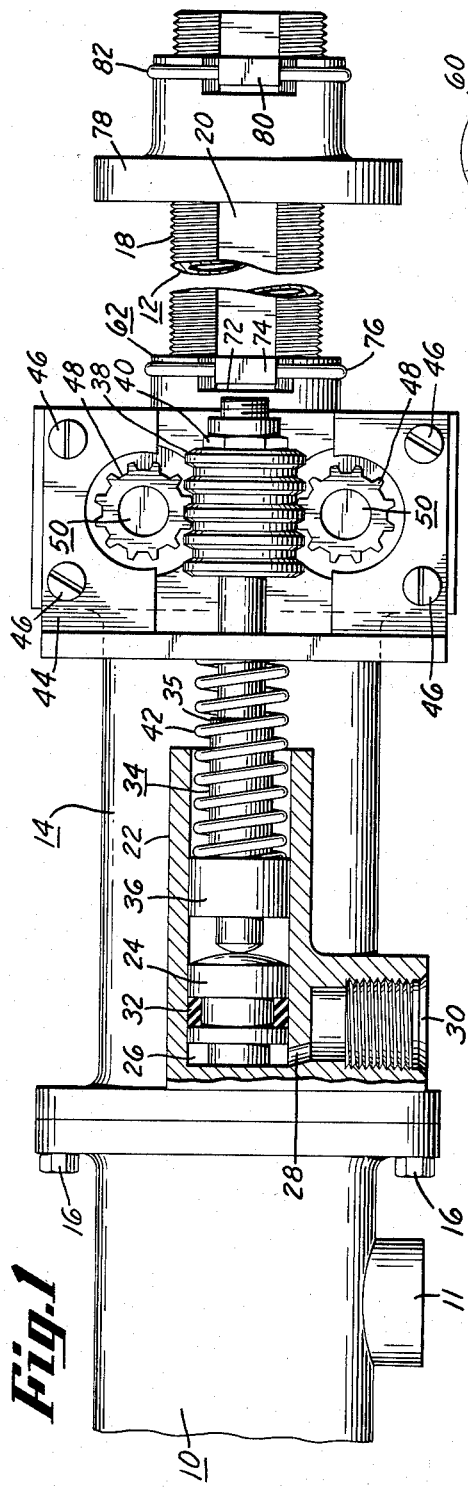
Jan. 26, 1965     H. M. GEYER     3,167,155
STROKE POSITIONING MEANS FOR AN ACTUATOR ASSEMBLY
Filed Dec. 4, 1962     2 Sheets-Sheet 1
INVENTOR.
HOWARD M. GEYER
BY
ATTORNEY

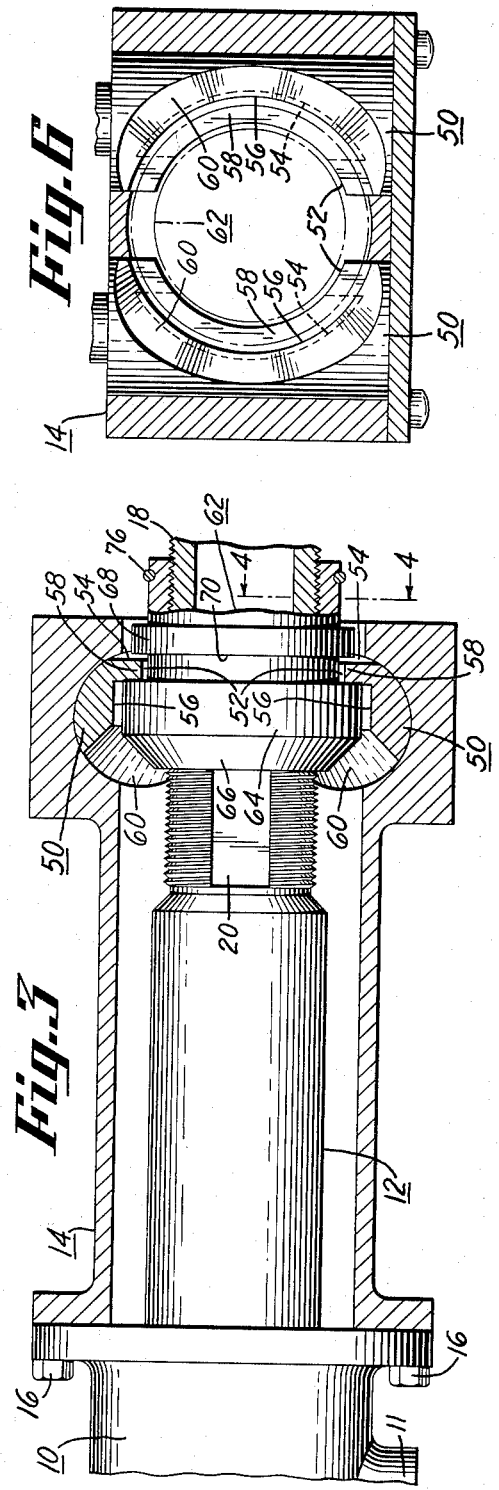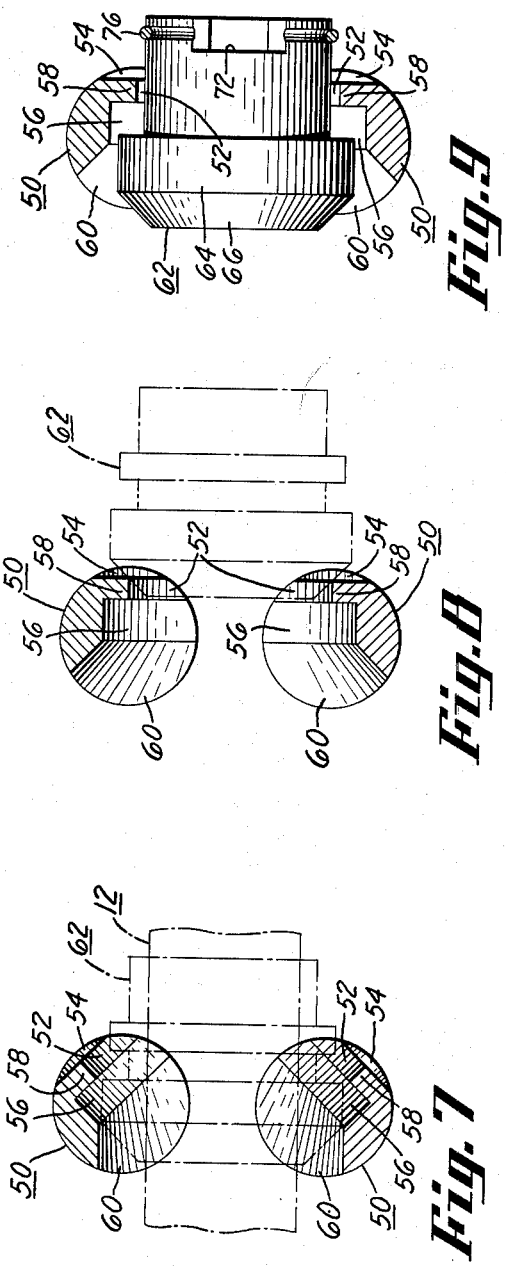

3,167,155
STROKE POSITIONING MEANS FOR AN
ACTUATOR ASSEMBLY
Howard M. Geyer, Dayton, Ohio, assignor to General
Motors Corporation, Detroit, Mich., a corporation of
Delaware
Filed Dec. 4, 1962, Ser. No. 242,285
9 Claims. (Cl. 188—67)

This invention pertains to fluid pressure operated actuators, and particularly to an improved stroke lock and stroke limiter for linear actuators.

Heretofore, fluid pressure operated linear actuators of the piston and cylinder type have embodied locking means for preventing actuator movement at one or more positions in the event of a hydraulic failure and, in addition, linear hydraulic actuators have embodied stroke limiting means which prevent actuator movement in one direction only upon a hydraulic failure. The present invention relates to an improved assembly which can be used as a lock to prevent movement of the actuator in both directions at a predetermined actuator position upon a hydraulic failure, or as a stroke limiter to prevent actuator movement in only one direction upon a hydraulic failure. Accordingly, among my objects are the provision of a fluid pressure operated linear actuator having means for locking the actuator against movement in both directions at an intermediate stroke position; the further provision of a fluid pressure operated linear actuator having means for limiting movement of the actuator in one direction at an intermediate stroke position; and the still further provision of a spring engaged, hydraulically releasable abutment means which can be used as a positive intermediate actuator stroke lock or a positive stroke limiter for preventing movement of the actuator in only one direction.

The aforementioned and other objects are accomplished in the present invention by utilizing a pair of transversely extending rotatable abutment pins that coact with abutment means on the piston rod to either lock the actuator against movement in both directions, or prevent actuator movement in only one direction at an intermediate stroke position of the actuator. The improved convertible intermediate stroke lock and stroke limited assembly is designed for use with a linear actuator of the piston and cylinder type wherein the cylinder is attached to a fixed support and the piston includes a rod which extends outside of the cylinder for attachment to a load device. In instances where the actuator is normally subjected to only a tension load, the pins coact with a flanged nut on the piston rod to positively limit extending movement of the actuator at an intermediate stroke position. In instances where the actuator is subject to both tension and compression loads, the nut has a second flange in axially spaced relation to the first flange such that the actuator will be locked against movement in both directions when the pins are aligned with the groove between the two flanges. In both embodiments the lock or the stroke limiter can be automatically engaged during retracting movement of the actuator, but can only be released by hydraulic fluid under pressure.

Further objects and advantages of the present invention will be apparent from the following description, reference being had to the accompanying drawings, wherein preferred embodiments of the present invention are clearly shown and wherein similar numerals depict similar parts throughout the several views.

In the drawings:

FIGURE 1 is a fragmentary view, partly in section and partly in elevation, of a portion of an actuator constructed according to the present invention.

FIGURE 2 is a fragmentary side elevational view of the actuator shown in FIGURE 1.

FIGURE 3 is a fragmentary view, partly in section and partly in elevation, taken along line 3—3 of FIGURE 2.

FIGURE 4 is a fragmentary sectional view with certain parts broken away, taken along line 4—4 of FIGURE 3.

FIGURE 5 is a sectional view taken along line 5—5 of FIGURE 4.

FIGURE 6 is a fragmentary sectional view taken along line 6—6 of FIGURE 2.

FIGURE 7 is a schematic view of the pins in the released, or open, position.

FIGURE 8 is a view similar to FIGURE 7 with the pins in the engaged, or closed, position.

FIGURE 9 is a schematic view illustrating the manner in which the stroke lock can be converted to a stroke limiter.

Referring to FIGURES 1 and 2, the improved convertible stroke lock and stroke limiter of the present invention are shown in combination with a hydraulically operated linear actuator of the type disclosed in Geyer Patent 2,955,574. The actuator includes a cylinder 10 having a reciprocable piston, not shown, disposed therein capable of fluid pressure operation in opposite directions. The piston divides the cylinder into an extend chamber and a retract chamber, and port 11 in the cylinder communicates with the retract chamber. A piston rod assembly 12 extends outside of the cylinder for attachment to a suitable load device, not shown, the piston rod being movable between predetermined fully extended and fully retracted stroke end positions. The convertible stroke lock and stroke limiter assembly is disposed in a housing 14 attached to the rod end of the cylinder by a plurality of bolts 16. The piston rod assembly 12, as shown in FIGURE 3, has a hollow externally threaded end portion 18 formed with an axial keyway 20.

The housing 14, which is cylindrical throughout the major portion of its length, carries a cylinder 22 having 22 having a reciprocable piston 24 disposed therein. The piston 24 defines a servo chamber 26 with the end wall of the cylinder 22, the servo chamber 26 being connected by a passage 28 with a port 30 for supplying hydraulic fluid under pressure to the chamber, 26 or connecting it to drain. The piston 24, as shown, carries an O-ring seal 32 in sealing engagement with the inner periphery of the cylinder walls.

A rod 34 having an enlarged shoulder 36 is slidably mounted in the cylinder 22 and extends axially outward therefrom. A cylindrical rack 38 is threadedly connected to the outer end of the rod 34 and held in its adjusted position by a nut 40. A coiled compression spring 42 is confined between a plate 44, attached to the housing 14 by threaded fasteners 46, and the shoulder 36 normally biases the rod 34 and the piston 24 to the position shown in FIGURE 1 when the servo chamber 26 is not pressurized.

The circular rack 38 meshes with a pair of gears 48 attached to a pair of pins 50 which extend transversely of the housing 14 and are journalled therein. As seen in FIGURES 4 through 6, the pins 50, constituting the rotatable abutment means, are formed with arcuate cutouts 52 and arcuate grooves 54 and 56 which define arcuate abutments 58. In addition, the pins 50 have conical surfaces 60.

When the servo chamber 26 is not pressurized, the spring 42 holds the piston 24 against the end wall of the cylinder and thus positions the pins 50 so that the arcuate flanges, or abutments, 58 are located in a plane normal to the axis of the piston rod 12, as shown in FIGURE 3. The arcuate cutouts 52 have a diameter greater than the diameter of the piston rod 12 and thus do not impair movement of the piston rod in either direction. When the servo chamber 26 is pressurized, the piston 24 moves to the right, as shown in FIGURE 1, thereby rotating the pins 50 in opposite directions through the cylindrical rack 38 and the gears 48, movement of the piston 24 and the rod 34 being limited by engagement of shoulder 35 of the rod with the plate 44. When the rod 34 is fully extended, the pins 50 are located in the positions depicted in FIGURE 7, wherein the arcuate flanges 58 are located in planes oblique to the axis of the piston rod and spaced a greater distance outwardly therefrom.

The threaded end portion 18 of the piston rod 12 is adapted to receive a nut assembly 62, as shown in FIGURE 3, which constitutes the abutment means on the piston rod engageable with the arcuate abutments 58 on the pins 50. To this end the nut assembly 62 is formed with a first radial flange 64 having a beveled, or frusto conical, surface 66, and a second radial flange 68 of smaller diameter than the flange 64 and spaced axially therefrom to define an annular groove 70. The nut assembly 62 can be adjusted relative to the rod 12 to determine the position at which the stroke lock or limit will be effective. To accomplish this result, the nut assembly 62 is formed with a cutout 72 for receiving a key 74 carried by a snap ring 76 and engageable with the keyway 20 to retain the nut assembly 62 in its adjusted position.

A second nut 78 may be attached to the outer end of the threaded portion 18 of the piston rod for engagement with the housing 14 to determine the fully retracted stroke end position of the actuator. The nut 78 is likewise adjustable relative to the piston rod and is secured in adjusted position by a key 80 carried by a snap ring 82 and engageable with the keyway slot 20. The stroke lock is shown in the engaged position in FIGURE 3 from which it is apparent that movement of the actuator in both directions is precluded. Thus, the abutments 58 on the pins 50 are disposed in the groove 70 and coact with the flanges 64 and 68 to prevent actuator movement in both directions. By applying hydraulic fluid under pressure to the servo chamber 26, the pins 50 will be rotated to the position of FIGURE 7 thus releasing the lock and permitting actuator movement in either direction. When the locking pins are in their released, or open, position, as shown in FIGURE 7, the abutments 58 are pivoted out of the annular groove 70 in the nut assembly 62, and the flange 64 is able to pass through the locking pins without interference by virtue of the conical surfaces 60 on the locking pins, as clearly shown in FIGURE 7.

The pins 50 are depicted in their engaged, or closed, position in FIGURE 8 with the nut assembly 62 of the piston rod disposed outboard thereof. With the several parts in this position, the actuator can be retracted since the beveled edge 66 on the nut is engageable with the abutments 58 and will impart outward pivotal movement to the pins 50 due to retracting movement of the actuator rod 12 through the intermediate stroke position. In so doing, the spring 42 is compressed due to axial movement of the rod 34 to the right caused by rotation of the gears 48 and linear movement of the cylindrical rack 38. However, as soon as the arcuate abutments 58 become aligned with the groove 70, the spring 42 will immediately expand thus pivoting the pins 50 inwardly to their engaged, or closed, positions so as to lock the actuator against further movement in either direction.

In order to convert the stroke lock into a stroke limiter for actuator designs subjected only to tension loads, and prevent only extending movement of the actuator at an intermediate stroke position, the flange 68 on the nut assembly 62 is removed as shown in FIGURE 9. In this embodiment, the abutments 58 coact solely with the flange, or abutment, 64 on the nut assembly 62 at an intermediate stroke position to limit further outward movement of the piston rod 12. As in the stroke lock embodiment, the pins 50 can be moved to released, or open, positions by hydraulic actuation of the release piston 24 so that the abutments 58 will clear the flange 64 and thus permit full extending movement of the actuator piston rod.

From the foregoing it is apparent that the present invention provides a unique positive acting intermediate stroke lock assembly for a linear hydraulic actuator which can be readily converted to a stroke limiter. In both embodiments, the stroke lock or the stroke limiter, when in the closed position, does not interfere with retracting movement of the actuator from the fully extended position to the intermediate stroke position since it will be mechanically released, or opened, as the actuator moves to the intermediate stroke position. Thereafter, however, it will be automatically operable to prevent further actuator movement in either direction, in the case of the stroke lock, or prevent extending movement of the actuator in the case of the stroke limiter.

While the embodiments of the invention as herein disclosed constitute preferred forms, it is to be understood that other forms might be adopted.

What is claimed is as follows:

1. In a linear actuator of the piston and cylinder type, a reciprocable rod extending outside of said cylinder and movable between predetermined stroke end positions, an abutment attached to said rod between its ends, a pair of coacting rotatable abutments supported by said cylinder and extending transversely thereof on opposite sides of said rod, resilient means normally operable to maintain said rotatable abutments in a first position wherein said rotatable abutments are engageable with said rod abutment at an intermediate stroke position of said rod so as to preclude further movement thereof in at least one direction, and means operable in opposition to said resilient means for rotating said rotatable abutments to a second position wherein said rotatable abutments do not engage said rod abutment and thus permit full movement of said rod between its predetermined stroke end positions.

2. In a linear actuator of the piston and cylinder type, a reciprocable rod extending outside of said cylinder and movable between fully retracted and fully extended stroke end positions, a nut adjustably attached to said rod between its ends and having at least one upstanding radial flange thereon, a pair of rotatable pins supported by said cylinder and extending transversely thereof on opposite sides of said rod, each pin having an arcuate flange, said pins having a first position wherein the arcuate flanges thereof are engageable with the flange on said rod at an intermediate stroke position of said rod for precluding further movement thereof in one direction, and means operable to rotate said pins to a second position wherein the arcuate flanges thereof do not engage the flange on said nut thus permitting movement of said rod between its fully extended and fully retracted stroke end positions.

3. The combination set forth in claim 2 wherein said nut includes a second upstanding radial flange spaced axially from the first flange so as to define an annular groove, and wherein the arcuate flanges on said pins are engageable with said groove so as to preclude movement of said rod in both directions at said intermediate stroke position.

4. In a linear actuator of the piston and cylinder type, a reciprocable rod extending outside of said cylinder and movable between fully extended and fully retracted stroke end positions, a nut adjustably attached to said rod between its ends and having an upstanding radial flange, a pair of rotatable pins supported by said cylinder and extending transversely thereof on opposite sides of said rod, each pin having an arcuate flange, resilient means for normally maintaining said pins in a first position wherein the arcuate flanges of said pins are engageable with the flange on said nut at an intermediate stroke position of said rod for precluding further movement of said rod in at least one direction, and means operable to rotate said pins in opposition to said resilient means to a second position wherein the arcuate flanges of said pins do not engage the flange on said nut and thus permit movement of said rod between its fully extended and fully retracted stroke end positions.

5. The combination set forth in claim 4 wherein said pins have geared engagement with a reciprocable rack supported on said cylinder, wherein said rack is attached to a reciprocable rod, and wherein said resilient means comprises a coil spring engaging said rod.

6. The combination set forth in claim 5 wherein the means for rotating said pins to the second position comprises a servo actuated piston engageable with said rod for effecting axial movement thereof in opposition to said spring.

7. The combination set forth in claim 4 wherein one surface of the flange on said nut is beveled, and wherein the beveled surface on said flange coacts with the arcuate flanges on said pins to automatically rotate said pins from the first position to the second position during movement of said rod in the opposite direction to said intermediate stroke position, said resilient means automatically returning said pins to the first position so that the arcuate flanges thereof are engageable with the flange on said nut to thereafter preclude movement of said rod in said one direction.

8. An intermediate stroke lock for a linear actuator having a reciprocable rod movable between predetermined stroke end positions, including, a nut attached to said rod between its ends and having a pair of axially spaced radial flanges defining an annular groove therebetween, a pair of rotatable pins supported by said actuator and extending transversely of said rod on opposite sides thereof, each pin having an arcuate flange, resilient means normally maintaining said pins in a first position wherein said arcuate flanges are engageable with the annular groove between the flanges of said nut so as to preclude movement of said rod in both directions at an intermediate stroke position thereof, and means acting in opposition to said resilient means for rotating said pins to a second position where said arcuate flanges are disengaged from the arcuate groove between the flanges on said nut so as to permit movement of said rod between its predetermined stroke end positions.

9. An intermediate stroke limiter for a linear actuator having a reciprocable rod movable between predetermined stroke end positions, including, a nut attached to said rod between its ends and having a radial flange, a pair of rotatable pins supported by said actuator and extending transversely of said rod on opposite sides thereof, each pin having an arcuate flange, resilient means normally maintaining said pins in a first position wherein the arcuate flanges thereof are engageable with the flange of said nut at an intermediate stroke position of said rod for precluding further movement of said rod in one direction, and means acting in opposition to said resilient means for rotating said pins to a second position wherein said arcuate flanges are disengaged from the flange on said nut to permit movement of said rod between its predetermined stroke end positions.

References Cited in the file of this patent
UNITED STATES PATENTS

| | | |
|---|---|---|
| 2,353,891 | Gruntorad | July 18, 1944 |
| 2,709,059 | Lear et al. | May 24, 1955 |
| 2,809,720 | Reid | Oct. 15, 1957 |
| 3,003,471 | Bodem et al. | Oct. 10, 1961 |